US007412607B2

(12) United States Patent
Magoshi

(10) Patent No.: US 7,412,607 B2
(45) Date of Patent: *Aug. 12, 2008

(54) METHODS AND APPARATUS FOR CUSTOMIZING A REWRITABLE STORAGE MEDIUM

(75) Inventor: Hidetaka Magoshi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/488,421

(22) Filed: Jul. 18, 2006

(65) Prior Publication Data

US 2006/0259787 A1 Nov. 16, 2006

Related U.S. Application Data

(63) Continuation of application No. 10/246,501, filed on Sep. 18, 2002, now Pat. No. 7,107,461.

(60) Provisional application No. 60/385,212, filed on Jun. 3, 2002.

(51) Int. Cl.
  *G06F 12/14* (2006.01)
  *G06F 17/00* (2006.01)
  *H04L 9/28* (2006.01)
(52) U.S. Cl. ............................. 713/193; 380/28; 463/29
(58) Field of Classification Search .................. None
See application file for complete search history.

(56) References Cited

U.S. PATENT DOCUMENTS

| 4,249,180 | A | 2/1981 | Eberle et al. |
| 4,558,176 | A | 12/1985 | Arnold et al. |
| 5,113,518 | A | 5/1992 | Durst et al. |
| 5,509,070 | A | 4/1996 | Schull |
| 5,530,752 | A | 6/1996 | Rubin |
| 5,828,862 | A | 10/1998 | Singkomrat et al. |
| 5,933,497 | A | 8/1999 | Beetcher et al. |
| 6,223,285 | B1 | 4/2001 | Komuro et al. |

(Continued)

FOREIGN PATENT DOCUMENTS

EP  0191162  8/1986

(Continued)

OTHER PUBLICATIONS

"Call for proposals for content protection & copy management technologies" Internet Citation, [Online] Jul. 5, 2001, XP002230687 Retrieved from the Internet:URL: http: //www. cptwg .org/Assets/ DVB-CPT-C1Prev1.2.PDF< [retrieved on Feb. 10, 2003].

*Primary Examiner*—Christopher A Revak
(74) *Attorney, Agent, or Firm*—Lerner, David, Littenberg, Krumholz & Mentlik, LLP

(57) ABSTRACT

Methods and apparatus permit: reading a rewritable storage medium, the rewritable storage medium including digital content and a flag indicative of whether the digital content is encrypted; determining whether the digital content of the rewritable storage medium is encrypted based on the flag; encrypting the digital content of the rewritable storage medium using an identification (ID) number as an encryption key when the flag indicates that the digital content is not encrypted, the ID number being unique to a processing apparatus operable to execute the digital content; and overwriting the digital content of the rewritable storage medium with the encrypted digital content.

23 Claims, 2 Drawing Sheets

U.S. PATENT DOCUMENTS

| | | |
|---|---|---|
| 6,256,390 B1 | 7/2001 | Okuyama et al. |
| 6,499,106 B1 | 12/2002 | Yaegashi et al. |
| 6,712,704 B2 | 3/2004 | Eliott |
| 6,792,615 B1 | 9/2004 | Rowe et al. |
| 7,107,461 B2 * | 9/2006 | Magoshi ................ 713/193 |
| 2003/0061500 A1 | 3/2003 | Mimura et al |
| 2003/0226026 A1 | 12/2003 | Magoshi |

FOREIGN PATENT DOCUMENTS

| | | |
|---|---|---|
| EP | 0302710 | 2/1989 |
| EP | 0593305 | 4/1994 |
| EP | 0773490 | 5/1997 |
| EP | 0860823 | 8/1998 |
| EP | 1065599 | 1/2001 |
| JP | 63-079133 | 4/1988 |
| JP | 07-182112 | 7/1995 |
| JP | 09-204360 | 8/1997 |
| JP | 10-003432 | 1/1998 |
| JP | 10-143438 | 5/1998 |
| JP | 11-265317 | 9/1999 |
| JP | 2000-207835 | 7/2000 |
| JP | 2001-307427 | 11/2001 |
| JP | 2002-042424 A | 2/2002 |
| JP | 2002-055608 | 2/2002 |
| WO | 01/74003 | 10/2001 |
| WO | 0229565 | 4/2002 |
| WO | WO 03/103291 A1 * | 12/2003 |

* cited by examiner

METHODS AND APPARATUS FOR CUSTOMIZING A REWRITABLE STORAGE MEDIUM

CROSS-REFERENCE TO RELATED APPLICATIONS

This application is a continuation of U.S. Pat. No. 7,107,461, filed on issued on Sep. 12, 2006, the entire disclosure of which is incorporated herein by reference. U.S. Pat. No. 7,107,461 claims the benefit of U.S. Provisional Patent Application No. 60/385,212, filed Jun. 3, 2002, the entire disclosure of which is hereby incorporated by reference.

BACKGROUND OF THE INVENTION

The present invention relates to methods and apparatus for customizing a rewritable storage medium such that only authorized use of digital content contained within the storage medium is permitted.

The widespread use of personal computers and other microprocessor-based equipment has opened very large and profitable markets in the sale of software applications that run on such computing equipment. Conventional software applications are stored on either a write-once or rewritable storage medium in order to distribute same to end users. Such storage media include (floppy) diskettes (such as 3.5-inch diskettes, 5.25-inch diskettes, etc.), discs (such as compact discs, CDs, CD-ROMs, CD-Is, CD-RWs, CD-ROM XAs, CD-Ws, Photo CDs, Video CDs, etc.), electronic storage media (such as programmable read only memories, PROMs, erasable programmable read only memories, EPROMs, electronic erasable programmable read only memories, EEPROMs, etc.)

As the software application is contained in the storage medium in digital form, those seeking to obtain unauthorized copies of the software application can easily do so. Moreover, irrespective of whether a particular copy of the software application is authorized or not, such software application may be loaded and run on any compatible computing device. Such copying and ease of use on different computing devices has the unfortunate effect of significantly reducing sales and profits on the software applications.

Accordingly, there are needs in the art for new methods and apparatus that permit the use of only authorized copies of software applications, or any other digital content, and to permit the use of such digital content on only authorized computing devices.

SUMMARY OF THE INVENTION

In accordance with one or more aspects of the present invention, an apparatus includes a connector operable to communicate with a rewritable storage medium, the rewritable storage medium including digital content and a flag indicative of whether the digital content is encrypted; a processing core operable to execute at least some of the digital content of the rewritable storage medium; a storage device operable to contain a substantially unique identification (ID) number; and an encryption unit operable to (i) determine whether the digital content of the rewritable storage medium is encrypted based on the flag, and (ii) encrypt and overwrite the digital content of the rewritable storage medium using the ID number as an encryption key when the flag indicates that the digital content is not encrypted.

The encryption unit is preferably further operable to set the flag of the rewritable storage medium to indicate that the digital content is encrypted.

The processing core preferably comprises the encryption unit by executing encryption program instructions obtained from an internal read only memory of the apparatus or from the rewritable storage medium.

The encryption unit may encrypt the digital content of the rewritable storage medium using at least one of an exclusive OR of the digital content and the ID number, transposition, substitution, polyalphabetic substitution, conventional key encryption, public key encryption, cipher system encryption, and code encryption.

The apparatus may further include a decryption unit operable to decrypt the digital content of the rewritable storage medium using the ID number as a decryption key.

The processing core preferably comprises the decryption unit by executing decryption program instructions obtained from an internal read only memory of the apparatus or from the rewritable storage medium.

A random access memory preferably receives the decrypted digital content of the rewritable storage medium.

The storage device of the apparatus is preferably at least one of a register, a read only memory (ROM), a programmable read only memory (PROM) and a discrete circuit.

The ID number is preferably not readable externally from the apparatus. The digital content of the rewritable medium is preferably not encrypted when initially stored. The digital content of the rewritable medium preferably includes data and instructions for a computer program. For example, the computer program may be a video game.

In accordance with one or more further aspects of the present invention, a rewritable storage medium includes: digital content; a flag indicative of whether the digital content is encrypted; and a connector operable to communicate with a processing apparatus, the processing apparatus including a processing core operable to execute at least some of the digital content of the rewritable storage medium, a storage device operable to contain a substantially unique identification (ID) number, and an encryption unit operable to (i) determine whether the digital content of the rewritable storage medium is encrypted based on the flag, and (ii) encrypt and overwrite the digital content of the rewritable storage medium using the ID number as an encryption key when the flag indicates that the digital content is not encrypted.

In accordance with one or more further aspects of the present invention, a method includes: reading a rewritable storage medium, the rewritable storage medium including digital content and a flag indicative of whether the digital content is encrypted; determining whether the digital content of the rewritable storage medium is encrypted based on the flag; encrypting the digital content of the rewritable storage medium using an identification (ID) number as an encryption key when the flag indicates that the digital content is not encrypted, the ID number being unique to a processing apparatus operable to execute the digital content; and overwriting the digital content of the rewritable storage medium with the encrypted digital content.

Other advantages, features and aspects of the invention will be apparent to one skilled in the art in view of the discussion herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION

Figure 1:
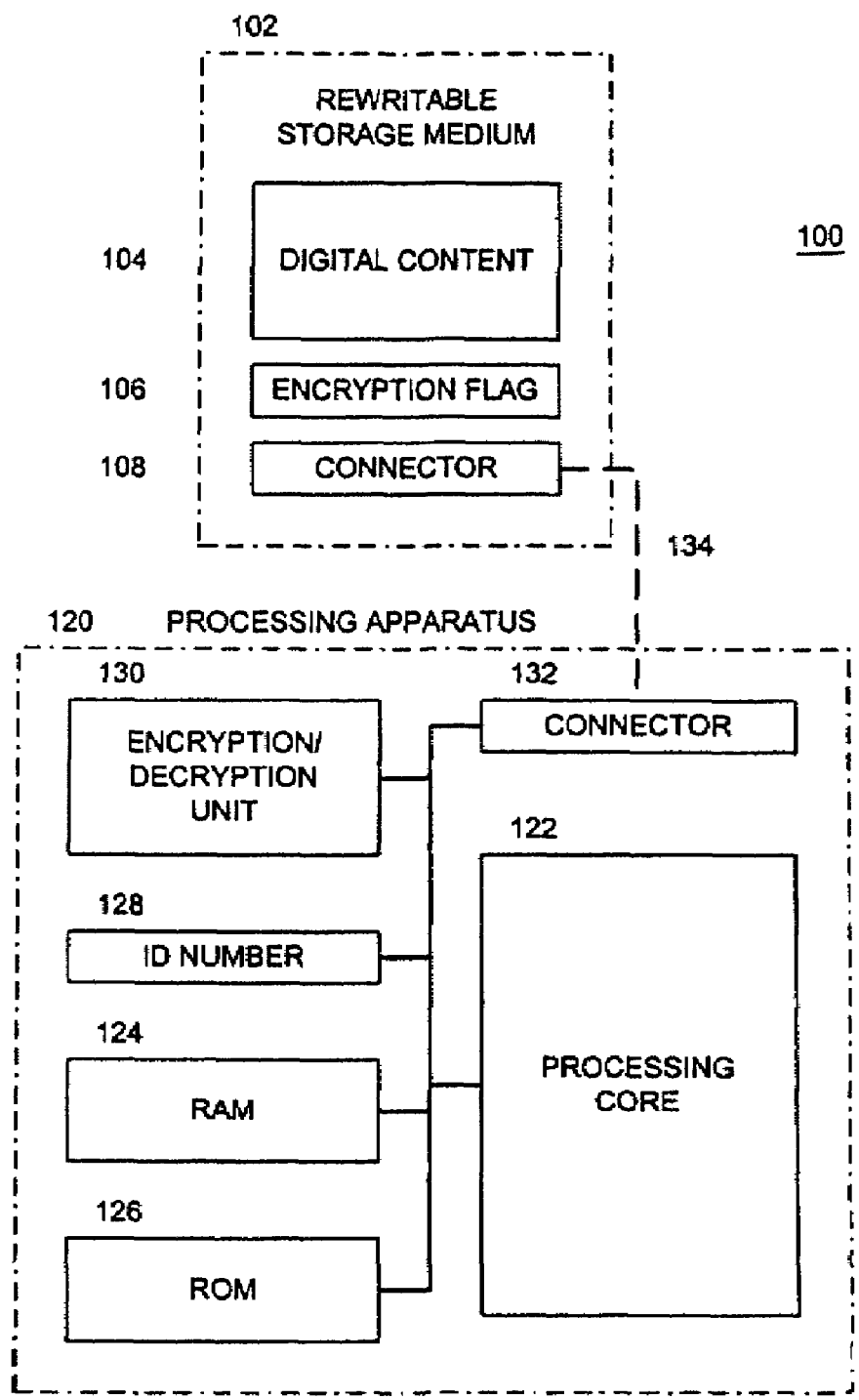
FIG. 1 is a block diagram illustrating one or more aspects of various apparatus that may be employed to implement one or more embodiments of the present invention.

Referring now to the drawings, wherein like numerals indicate like elements, there is shown in FIG. 1 a block diagram of a computing system 100, including a rewritable storage medium 102 and a processing apparatus 120.

The rewritable storage medium 102 may be implemented utilizing any of the known media, such as diskettes, discs, electronic media, etc., or any storage media hereinafter developed. The rewritable storage medium 102 preferably includes digital content 104, an encryption flag 106, and a connector 108. The digital content 104 may be a software application, including data and program instructions, or any other digital content of interest. The encryption flag 106 is preferably stored within a hardware register, an addressable storage location (or locations), a fuse array, or any other suitable storage device. The encryption flag 106 is preferably indicative of whether the digital content 104 is customized, such as by encryption, or is in a state that is ready for use. The connector 108 is preferably implemented utilizing any of the known or hereinafter developed devices that operate to permit communication between the rewritable storage medium 102 and the processing apparatus 120 over a communications channel 134.

The processing apparatus 120 is preferably implemented utilizing any of the known microprocessor architectures, such as those found in any personal computer, lap-top computer, set-top box, personal digital assistant, cell phone, hand held computer, etc. To this end, the processing apparatus 120 preferably includes a processing core 122, a random access memory (RAM) 124, and a read only memory (ROM) 126. Unlike existing microprocessor architectures, however, the processing apparatus 120 also preferably includes an identification (ID) number 128 and an encryption/decryption unit 130. The processing core 122 is preferably operable to execute program instructions and manipulate data, such as may be received from the RAM 124 and/or ROM 126 as is known in the art.

The processing apparatus 120 also preferably includes a connector 132, which may be implemented utilizing any of the known devices that are operable to permit communication with the rewritable storage medium 102 over the communications channel 134. It is noted that the communications channel 134 may be a hard-wired channel, such as a cable, or may be a wireless channel, such as an infrared link, an RF link, etc.

The ID number 128 is preferably unique (or substantially unique) to the processing apparatus 120, such as a serial number or other identifying alphanumeric code. Preferably, the ID number 128 is not readable externally from the processing apparatus 120 and, therefore, remains secure and hidden from unauthorized persons. The encryption/decryption unit 130 preferably utilizes the ID number 128 to encrypt and/or decrypt the digital content 104 of the rewritable storage medium 102.

Figure 2:
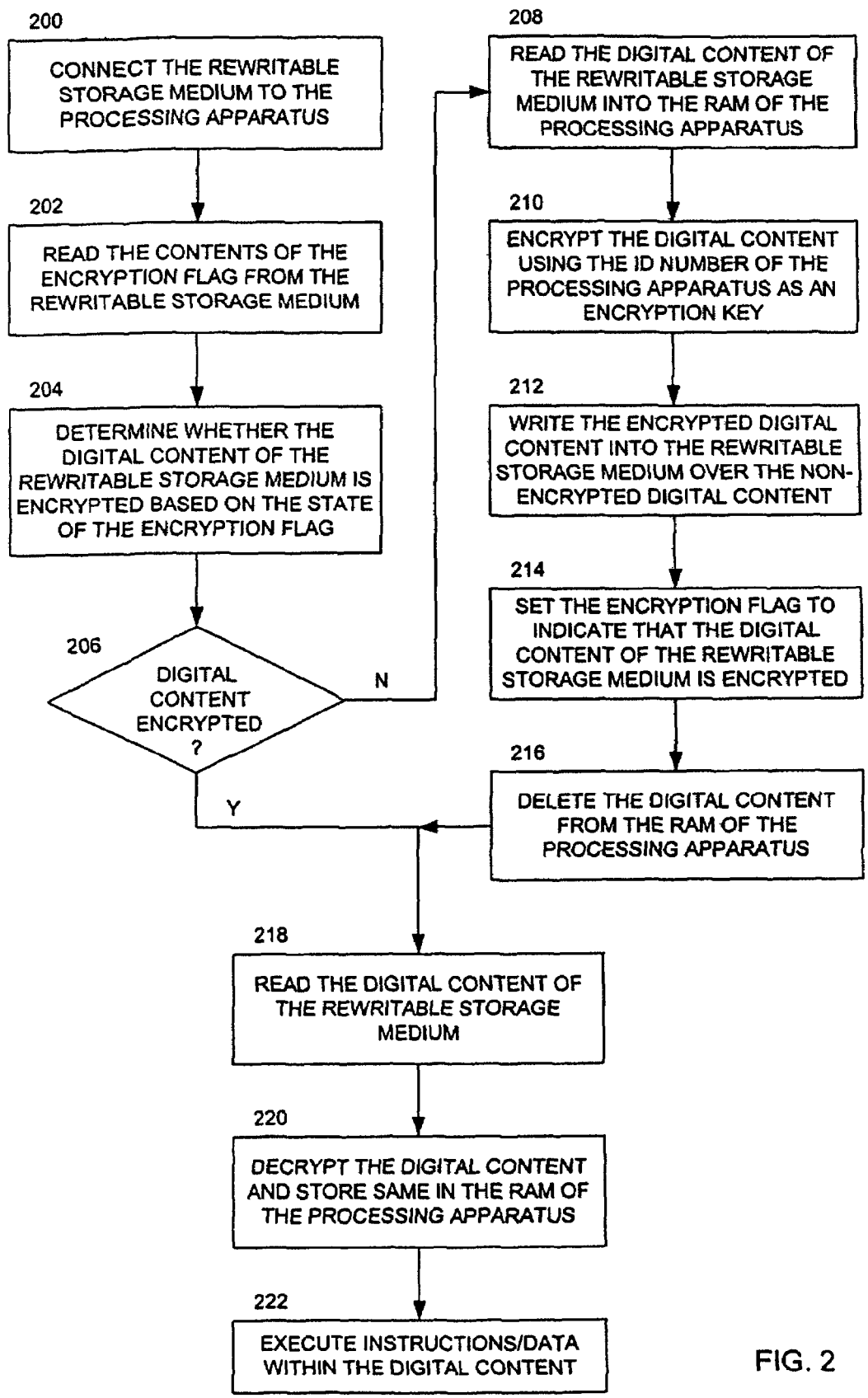
FIG. 2 is a flow diagram illustrating one or more methods that may be carried out in accordance with various aspects of the present invention.

With reference to FIGS. 1 and 2, the use of the encryption flag 106 of the rewritable storage medium 102 and the ID number 128 of the processing apparatus 120 in encrypting and/or decrypting the digital content 104 in accordance with various aspects of the invention will now be discussed in more detail. In particular, at action 200 (FIG. 2) the rewritable storage medium 102 is connected to the processing apparatus 120 by way of the connectors 108, 132 and the communications channel 134. Such connection (or other event, such as power-up) preferably signals the processing apparatus 120 to read the contents of the encryption flag 106 of the rewritable storage medium 102. More particularly, the encryption/decryption unit 130 may read the contents of the encryption flag 106 and/or the processing core 122 may perform that function. It is noted that the functions of the encryption/decryption unit 130 may be performed by the processing core 122 by executing an appropriate software program that may be contained, for example, within the ROM 126 (which would render a separate encryption/decryption unit 130 unnecessary).

At action 204, a determination is made as to whether the digital content 104 of the rewritable storage medium 102 is encrypted based on the state of the encryption flag 106. For example, when the encryption flag has a form containing one or more bits, the state of such bits may be utilized to determine whether the digital content 104 is encrypted. When the encryption flag 106 is a single bit, one of a true (e.g., logic high) state or a false (e.g., logic low) state may represent that the digital content 104 is encrypted. The determination of whether the digital content is encrypted may be carried out by the encryption/decryption unit 103 and/or by the processing core 122 under the control of a suitable software program.

At action 206, the process flow branches to action 208 (if the digital content 104 is not encrypted) or to action 218 (if the digital content 104 is encrypted). When the digital content 104 is not encrypted, the processing apparatus 120 preferably reads the digital content 104 of the rewritable storage medium 102 into the RAM 124 (action 208). At action 210, the encryption/decryption unit 130 preferably encrypts the digital content 104 (contained within the RAM 124) utilizing the ID number 128 of the processing apparatus 120 as an encryption key. It is noted that any of the known encryption techniques may be employed in accordance with the present invention, such as utilizing at least one of an exclusive OR of the digital content 104 and the ID number 128, transposition techniques, substitution techniques, polyalphabetic substitution techniques, conventional key encryption, public key encryption, cipher system encryption, code encryption, etc.

At action 212, the encrypted digital content 104 is written over the non-encrypted digital content 104 contained within the rewritable storage medium 102. At action 214, the encryption flag 106 is set to indicate that the digital content 104 contained within the rewritable storage medium 102 is encrypted. The non-encrypted digital content 104 stored within the RAM 124 is preferably deleted at action 216.

At action 218, which may follow action 216 or may be the result of an affirmative branch at action 206, the encrypted digital content 104 contained with the rewritable storage medium 102 is read. The encrypted digital content 104 is decrypted utilizing the ID number 128 as a decryption key and the decrypted digital content 104 is stored in the RAM 124 (action 220). Thereafter, the processing core 122 is free to execute the instructions/data that may be contained within the digital content 104 (action 222).

Preferably, the digital content 104 is not encrypted when an initially stored within the rewritable storage medium 102 (e.g., during manufacturing). Advantageously, an end user may purchase the rewritable storage medium 102 from a distributor and run the digital content 104 on his or her processing apparatus 120 (e.g., personal computer or set-top box). Once the rewritable storage medium 102 is connected to the processing apparatus 120 of that particular end user, however, the digital content 104 will be encrypted utilizing the unique ID number 128. Therefore, the encrypted digital content 104 will not be permitted to run on a different processing apparatus 120 (i.e., a processing apparatus that includes a different ID number 128 or no ID number at all). This advantageously protects the entity or entities interested in profiting from the sale of the digital content 104 to end users. By way of example, the digital content 104 of the rewritable storage medium 102 may include data and program instructions for a video game. Indeed, the present invention addresses the significant problems that exist in the video game market in terms of multiple end users sharing one copy of a game title for use on multiple computing systems.

Alternatively, the digital content 104 may include data and program instructions for a boot code read only memory for the processing core 122. By customizing, e.g., encrypting, the code in a boot ROM utilizing the ID number 128 as an encryption key, the boot code and the processing apparatus 120 are secured from unauthorized observations and/or operations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
a connector operable to facilitate communication between the apparatus and a rewritable storage medium, the rewritable storage medium including stored digital content and a flag indicative of whether the stored digital content is encrypted;
a processing core operable to execute at least some of the stored digital content;
a storage device operable to contain an identification (ID) number; and
an encryption unit operable to (i) determine whether the stored digital content is encrypted based on the flag, and (ii) encrypt the stored digital content using the ID number as an encryption key, and overwrite the stored digital content with the encrypted digital content when the flag indicates that the stored digital content is not encrypted.

2. The apparatus of claim 1, wherein the encryption unit is further operable to set the flag of the rewritable storage medium to indicate that the stored digital content is encrypted.

3. The apparatus of claim 1, wherein the encryption unit includes a recording medium having instructions recorded thereon which are executable by the processing core to (i) determine whether the stored digital content of the rewritable storage medium is encrypted based on the flag, and (ii) encrypt the stored digital content using the ID number as an encryption key, and overwrite the stored digital content with the encrypted digital content when the flag indicates that the stored digital content is not encrypted.

4. The apparatus of claim 1, wherein the encryption unit is operable to encrypt the stored digital content using at least one of an exclusive OR of the stored digital content and the ID number, transposition, substitution, polyalphabetic substitution, conventional key encryption, public key encryption, cipher system encryption, and code encryption.

5. The apparatus of claim 1, further comprising a decryption unit operable to decrypt the stored digital content using the ID number as a decryption key.

6. The apparatus of claim 5, wherein the decryption unit includes a recording medium having instructions recorded thereon which are executable by the processing core to perform the decryption.

7. The apparatus of claim 5, further comprising a random access memory operable to receive the decrypted digital content.

8. The apparatus of claim 1, wherein the storage device is at least one of a register, a read only memory (ROM), a programmable read only memory (PROM) and a discrete circuit.

9. The apparatus of claim 1, wherein the ID number is not readable externally from the apparatus.

10. The apparatus of claim 1, wherein the rewritable storage medium stores the digital content in unencrypted form prior to the rewriteable storage medium first being placed in communication with the apparatus.

11. The apparatus of claim 1, wherein the stored digital content includes data and instructions for a computer program.

12. The apparatus of claim 11, wherein the computer program is a video game.

13. The apparatus of claim 1, wherein the stored digital content includes data and instructions for a boot code read only memory (ROM) for the processing core.

14. The apparatus of claim 1, wherein the rewritable storage medium is at least one of an electronic erasable programmable read only memory (EEPROM), a flash memory, and a disk medium.

15. The apparatus of claim 1, wherein the rewritable storage medium is removably connectable to the connector.

16. A rewritable storage medium, comprising:
stored digital content;
a flag indicative of whether the stored digital content is encrypted; and
a connector operable to facilitate in communication with a processing apparatus, the processing apparatus including a processing core operable to execute at least some of the stored digital content, a storage device operable to contain an identification (ID) number, and an encryption unit operable to (i) determine whether the stored digital content of the rewritable storage medium is encrypted based on the flag, and (ii) encrypt the stored digital content using the ID number as an encryption key, and overwrite the stored digital content with the encrypted digital content when the flag indicates that the stored digital content is not encrypted.

17. The rewritable storage medium of claim 16, wherein the encryption unit is further operable to set the flag to indicate that the stored digital content is encrypted.

18. The rewritable storage medium of claim 16, wherein the stored digital content is not encrypted prior to the rewriteable storage medium first being placed in communication with the processing apparatus.

19. The rewritable storage medium of claim 16, wherein the stored digital content includes data and instructions for a video game.

20. The rewritable storage medium of claim 19, wherein the computer program is a video game.

21. The rewritable storage medium of claim 16, wherein the stored digital content includes data and instructions for a boot code read only memory (ROM) for the processing apparatus.

22. The rewritable storage medium of claim 16, wherein the rewritable storage medium is at least one of an electronic erasable programmable read only memory (EEPROM), a flash memory, and a disk medium.

23. The rewritable storage medium of claim 16, wherein the connector is removably connectable to the processing apparatus.

* * * * *